(12) United States Patent
Nguyen

(10) Patent No.: US 11,049,070 B2
(45) Date of Patent: Jun. 29, 2021

(54) CASH-POINT INVENTORY MANAGEMENT WITH DEMAND FORECASTING

(71) Applicant: Giesecke+Devrient Currency Technology America, Inc., Dulles, VA (US)

(72) Inventor: Keith Nguyen, Brampton (CA)

(73) Assignee: Giesecke+Devrient Currency Technology America, Inc., Dulles, VA (US)

(*) Notice: Subject to any disclaimer, the term of this patent is extended or adjusted under 35 U.S.C. 154(b) by 246 days.

(21) Appl. No.: 15/749,980

(22) PCT Filed: May 25, 2016

(86) PCT No.: PCT/US2016/034111
§ 371 (c)(1),
(2) Date: Feb. 2, 2018

(87) PCT Pub. No.: WO2017/023399
PCT Pub. Date: Feb. 9, 2017

(65) Prior Publication Data
US 2018/0218323 A1    Aug. 2, 2018

Related U.S. Application Data

(60) Provisional application No. 62/201,558, filed on Aug. 5, 2015.

(51) Int. Cl.
*G06Q 10/08* (2012.01)
*G06Q 40/02* (2012.01)
*G06Q 30/02* (2012.01)

(52) U.S. Cl.
CPC ....... *G06Q 10/0875* (2013.01); *G06Q 10/087* (2013.01); *G06Q 30/02* (2013.01); *G06Q 30/0202* (2013.01); *G06Q 40/02* (2013.01)

(58) Field of Classification Search
None
See application file for complete search history.

(56) References Cited

U.S. PATENT DOCUMENTS 7,340,415 B1 * 3/2008 Gasper .............. G06Q 20/1085
705/43
7,946,474 B1 * 5/2011 Agrawal .............. G06Q 10/04
235/376

(Continued)

FOREIGN PATENT DOCUMENTS

WO    2013/067042 A2    5/2013

OTHER PUBLICATIONS

European Patent Office, Extended European Search Report in EP Patent Application No. 16833447.2, dated Nov. 23, 2018.

(Continued)

*Primary Examiner* — Fateh M Obaid
(74) *Attorney, Agent, or Firm* — Faegre Drinker Biddle & Reath LLP

(57) ABSTRACT

A method includes receiving currency demand data for a plurality of cash-points, and currency attribute data for notes at each of the plurality of cash-points. The method also includes determining a first currency allocation indicative of a current allocation of the notes at each of the plurality of cash-points based on the currency attribute data. The method still further includes determining a second currency allocation indicative of a future allocation of the notes required to meet an expected currency demand at each of the plurality of cash-points based on the currency demand data. The method additionally includes determining a schedule for transferring the notes between one or more of the plurality of cash-points to meet the second currency allocation and initiating transfer of the notes according to the schedule to (Continued)

effect the second currency allocation in the cash-points to meet the expected currency demand.

17 Claims, 4 Drawing Sheets

(56) References Cited

U.S. PATENT DOCUMENTS

| | | | |
|---|---|---|---|
| 8,527,336 B2 | 9/2013 | Kothari et al. | |
| 9,058,598 B1* | 6/2015 | Li | G06Q 10/04 |
| 2004/0030622 A1* | 2/2004 | Ramos | G06Q 10/08 |
| | | | 705/35 |
| 2006/0235739 A1* | 10/2006 | Levis | G06Q 10/08 |
| | | | 705/1.1 |
| 2006/0282277 A1* | 12/2006 | Ng | G06Q 10/08 |
| | | | 705/333 |
| 2007/0174156 A1* | 7/2007 | Emde | G06Q 40/02 |
| | | | 705/30 |
| 2007/0179874 A1 | 8/2007 | Spirgel et al. | |
| 2007/0192244 A1 | 8/2007 | Drummond et al. | |
| 2008/0314981 A1 | 12/2008 | Eisenson | |
| 2009/0319429 A1* | 12/2009 | Scully | G06Q 40/02 |
| | | | 705/50 |
| 2010/0131407 A1* | 5/2010 | Folk | G06Q 20/10 |
| | | | 705/39 |
| 2012/0066014 A1 | 3/2012 | Walker et al. | |
| 2014/0201012 A1 | 7/2014 | Doran et al. | |
| 2015/0071522 A1 | 3/2015 | Chae et al. | |
| 2015/0101906 A1 | 4/2015 | George et al. | |
| 2015/0186992 A1 | 7/2015 | Blakeslee et al. | |
| 2018/0218555 A1 | 8/2018 | Nguyen | |

OTHER PUBLICATIONS

Korean Intellectual Property Office (ISA), International Search Report and Written Opinion for International Application No. PCT/US2016/034111, dated Aug. 30, 2016.
Korean Intellectual Property Office (ISA), International Search Report and Written Opinion for International Application No. PCT/US2016/034113, dated Aug. 19, 2016.
U.S. Patent and Trademark Office, Office Action for U.S. Appl. No. 15/749,955, dated Jul. 25, 2019.
U.S. Patent and Trademark Office, Final Office Action for U.S. Appl. No. 15/749,955, dated Feb. 19, 2019.
U.S. Patent and Trademark Office, Office Action for U.S. Appl. No. 15/749,955, dated Jul. 18, 2018.
U.S. Patent and Trademark Office, Notice of Allowance for U.S. Appl. No. 15/749,955, dated Nov. 15, 2019.

* cited by examiner

CASH-POINT INVENTORY MANAGEMENT WITH DEMAND FORECASTING

CROSS REFERENCE TO RELATED APPLICATIONS

This application is the National Stage of International Patent Application No. PCT/US2016/034111, filed May 25, 2016, and claims priority to U.S. Provisional Patent Application Ser. No. 62/201,558, filed Aug. 5, 2015, which is incorporated by reference herein in its entirety for all purposes.

TECHNICAL FIELD

The present disclosure relates generally to inventory management, and more specifically to cash-point inventory management with demand forecasting.

BACKGROUND

Banks, credit unions, and other financial institutions require access to cash to meet the fluctuating demand requirements of their customers. Certain cash-points associated with a financial institution may, over time, receive a large number of withdrawal requests, contributing to a shortfall in currency reserves at that location. Other cash-points may receive a disproportionate number of cash deposits, and accumulate substantial cash reserves. This imbalance of reserve currency, vault cash, or cash-on-hand presents a variety of risks and inefficiencies for banks.

Financial institutions often aim to decentralize reserve inventories. For example, a large national bank provides a number of commercial locations for providing face-to-face and automated services to its customers. These locations often hold currency reserves in order to service these customer interactions, allowing customers to deposit checks and cash, withdraw funds, and access banking services. These financial institutions may also maintain vaults at various locations throughout a region, including sometimes within these customer-facing locations, to provide liquidity to remote branches, decentralize risk of natural disasters and theft, and provide a currency distribution network.

Banks are often required by regulations to maintain a certain level of excess reserves within these vaults. Maintenance of this reserve ratio is critical to the bank's continued operations. If currency reserves fall below the reserve ratio, the bank may be sanctioned. If reserves rise above the reserve ratio, the bank may miss opportunities for productive investment. To complicate matters, the amounts required for the reserve ratio are constantly changing. Bank managers face considerable logistical challenges associated with maintaining adequate levels of currency within its cash-points.

Maintenance of the proper reserve ratio is not enough. Allocation of those reserves throughout a financial institution's cash-points is critical to accommodating large cash withdrawals and other customer requests. Unexpected increases in currency demand in disparate geographic regions may cause currency shortages in certain bank locations. Further, not all currency is equally desirable for every purpose. Fulfillment of certain currency demand requests requires delivery of a particular caliber or quality of banknote. For example, Automated Teller Machines (ATM's) require higher quality currency.

Technology in the field of currency processing systems has yielded advancements in currency counting, counterfeit detection, and fitness calculation, enabling most businesses to obtain devices that automatically count, sort, and account for cash inventories. Particular devices may be capable of connecting to a network and providing output to a software system.

In certain currency processing systems, deposited banknotes are analyzed for integrity and quality. If the system determines that banknote or other currency object cannot be read properly, is damaged, is counterfeit, or is otherwise unfit for continued circulation, the system will generally reject the banknote or currency object for second review of the note. These systems may track deposited notes by serial number or other identifier, and store information regarding accepted and rejected notes in a database. Thus, certain cash management systems may have invoicing and tracking functionality for monitoring deposited banknotes. These systems may be implemented at various cash centers within a financial institution.

The cash cycle describes what happens to currency from printing to destruction. Currency is created and distributed by Central Banks (and similar authorities), enters circulation, is used and reused many times, and eventually reaches a point where it is worn or soiled and must be replaced with a new note. This also is true for other currency objects such as Food Coupons, Casino Vouchers, Cash-Out Tickets and other types of currency objects used in commerce.

Currency (also known as banknotes) is dispensed, carried, spent, stored, exchanged and transported. Currency is transported in bulk from places of excess buildup, such as retailers, to more secure locations, such as Cash-in-Transport (CIT) facilities, bank vaults, etc. Whenever notes are aggregated, they must be sorted and counted. In virtually all places where any reasonable volume must be counted, this is done with machines of varying levels of speed and sophistication.

In the past several decades, the use of machines to count, sort and validate currency has expanded significantly in terms of both quantity and breadth of functionality. Some machines are used to count, sort, authenticate, capture serial numbers, evaluate fitness and even destroy banknotes (where this is authorized) at speeds up to or exceeding 44 banknotes per second. Output from these devices can be used to monitor currency deposits at various cash-points within a financial institution.

SUMMARY OF INVENTION

According to aspects of the present disclosure, a method includes receiving currency demand data for a plurality of cash-points, and currency attribute data for notes at each of the plurality of cash-points. The method also includes determining a first currency allocation indicative of a current allocation of the notes at each of the plurality of cash-points based on the currency attribute data. The method additionally includes determining a second currency allocation indicative of a future allocation of the notes required to meet an expected currency demand at each of the plurality of cash-points based on the currency demand data. The method also further includes determining a schedule for transferring the notes between one or more of the plurality of cash-points to meet the second currency allocation. The method also includes initiating transfer of the notes according to the schedule to effect the second currency allocation in the plurality of cash-points to meet the expected currency demand.

Other features and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION

Figure 1:
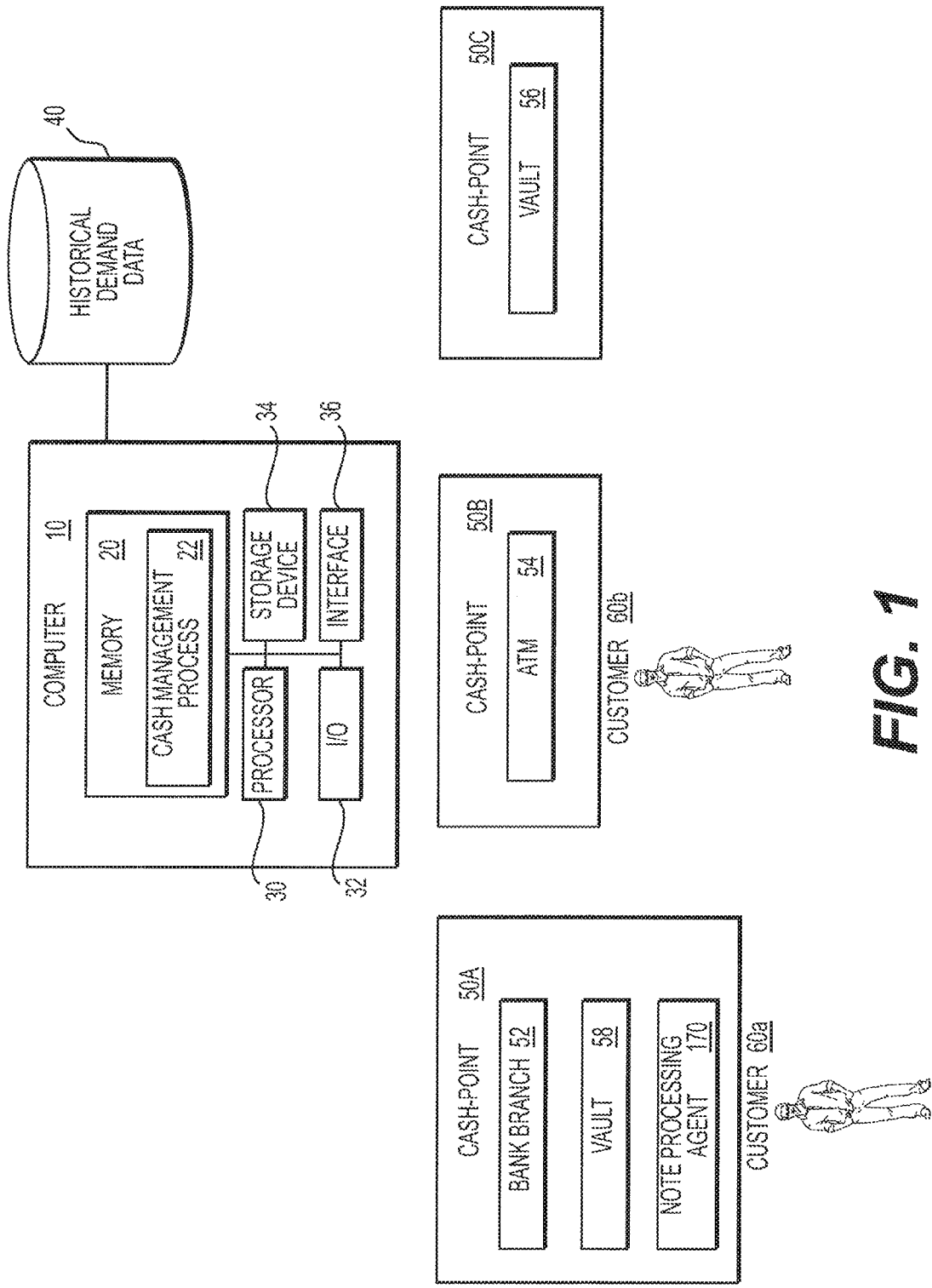
FIG. 1 illustrates a high level block diagram of a system for cash-point inventory management with demand forecasting in accordance with a particular non-limiting embodiment of the present disclosure.

Although many of the exemplary embodiments disclosed herein, as well as in these disclosures, are directed toward banking and accounting, the invention disclosed herein is not limited to applications in the field of banking and accounting, but rather is applicable to a wide range of applications in the financial services industry and beyond, including, but not limited to, retail banking, retail commerce, currency exchanges, law enforcement, central banking, clearing houses and processing of commercial paper, accounting, auditing, casino operations, gaming, transit agency operations, and many other fields.

Banks, credit unions, and other financial institutions require cash management systems to monitor and manage banknote and coin inventories. Cash processing procedures can be controlled and monitored using specialized software and hardware configured to collect and process currency and optimize cash management processes at any number of branches, vaults, ATM's or the like (e.g., cash-points). These systems can utilize existing processes and infrastructure, such as existing cash management machines, currency counters, cash recyclers, smart-safes, and the like, as well as a variety of other currency or banknote inventory, or vault management components to create a scalable solution for cash cycle management and provisioning.

Currency processing and inventory management techniques have evolved from simple deposit and withdrawal account balancing systems to sophisticated currency counting machines. Certain modern currency counting machines include functionality for processing banknotes and collecting detailed information regarding currency condition, denomination, serial number, location, and other currency attributes. Banks can use these machines to manage deposited currency and currency held in inventory in vaults. For example, a national bank may use cash processing machines with specialized capabilities for currency counting and management, including deposit and withdrawal tracking, in each of its branches and ATM's, resulting in an untapped source of data regarding current banknote inventories at each of the bank's many disparate branches and ATM's and historical transaction activity. Bank employees may utilize software (e.g., SAP® software) that works in connection with these machines to manage and process withdrawals, deposits, and other banking services.

Cash inventories may also be tracked via manual processes, such as by tellers at a bank branch window. Software may function in connection with various devices to dispense and/or receive currency and manage currency inventory including currency quality and defect information, denomination information, circulation information, and information regarding the source of the currency (e.g., the depositor or the transferring institution). As another example, bank vaults may manually be inspected and bank employees may manually take inventory of cash reserves at each particular cash-point in a financial institution.

Thus, a large amount of information regarding various cash-points associated with a financial organization is dispersed across various heterogeneous systems and data sources. This information may need to be formatted and manually loaded into a database to conduct even basic analysis. For example, in order to account for reserves at each bank branch, data from several data sources may need to be manually retrieved and aggregated. If a particular cash-point is running low on excess reserves, managers must manually schedule delivery of excess cash to the cash-point or must take further action as needed to provide the cash-point with the reserves required to accommodate demand. However, at this point it may be too late, and customers may be unable to withdraw or access funds at the desired branch.

Banks may waste resources on inefficient delivery mechanisms in the currency management systems of today. Delivery operations are manually scheduled and little or incomplete analysis of logistical efficiencies is conducted, causing banks to waste resources on inefficient delivery mechanisms. Further, little planning is conducted to prepare for anticipated or expected events. For example, an organization may anticipate a large demand for cash withdrawals on Fridays before a holiday weekend. It may be advisable to start transferring reserve currency to local vaults in regions where expected demand is high at least 2 weeks in advance of such an event. Conducting such preparations in anticipation of withdrawal demand may be extremely difficult and require analysis of many factors, including lowest cost shipping routes between branches, and a determination of which branches have serviceable currency on hand. Waiting until a shortage of funds exists leaves bank managers with little choice in terms of fund transfer scheduling. For example, if more time is provided an analysis of long-term solutions may be conducted, including initiating a recurring shipment of currency. As another example, analysis of the most efficient cash-point for supplying reserves may be conducted. As yet another example, an analysis of the quality of banknotes at various vaults may be conducted, and, if required, a particular class of banknotes may be assembled and shipped.

The teachings of the present disclosure provide a system for banknote inventory processing and management using historical transaction information for forecasting currency demand and scheduling optimal placement of currency reserves. Transfer of currency reserves can be optimized to use the most efficient delivery route, the most cost effective carrier, or quickest delivery time, depending on the needs of the organization. Currency reserves can also be scheduled for transfer based on availability of serviceable banknotes. Scenario forecasting includes generating and displaying models to showcase currency delivery schedules in action against forecasted demand. The forecasted demand can be modified to assess the organization's preparedness for unexpected demand events. Additional scenarios could also be planned for, such as unexpected natural disasters and other unexpected events, such that reserves are efficiently deposited at cash-points.

The teachings of the present disclosure enable cash center operators and bank managers to obtain information regarding cash processing systems, as well as information regarding reserve banknotes and withdrawal information at each cash-point in their service area. These systems support the specific needs of cash centers with varying types of operation. For example, withdrawal rate and reserve information are often considered for management of automated teller machines, while deposit, withdrawal, quality, and reserve information are, more often, relevant to track at the branch level. Integrated inventory management systems provide a constant overview of the amounts of banknotes being processed at each cash center in an organization.

In certain exemplary embodiments, this information is collected and utilized at or near real-time to influence decision making processes within cash management processes. For example, a commercial bank concerned with accommodating demand requirements at local branches can coordinate and schedule transfer of banknotes between branches to meet this excess demand. As another example, a central bank concerned with decentralizing currency reserves and maintenance of liquidity and required reserve ratios at various banks can schedule the transfer and production of banknotes based on current cash processing and inventory information gathered by these systems.

It should be noted that the terms currency and banknote may be used interchangeably in the present disclosure. Currency comprises money in any form in actual use or circulation as a medium of exchange, including banknotes and coins. Cash-points, as used herein, may refer to a bank, branch, ATM, vault, cash register, payment terminal, or any other location where currency is stored or transacted.

With reference to FIG. 1, a system 100 for cash-point inventory management with demand forecasting is illustrated in accordance with a non-limiting embodiment of the present disclosure. System 100 includes computer 10 with memory 20, processor 30, input/output device 32, interface 36, and storage device 34. Storage device 34 can include any primary or secondary storage device including read-only memory, flash memory, magnetic computer storage devices (e.g., hard disks, floppy disks, and magnetic tape), optical discs, solid state disks, and the like. Processor 30 loads instructions into memory 20 and executes cash management process 22. Computer 10 interfaces with historical demand data 40 via a network. Cash-points 50a-c are dispersed throughout the service area for a financial organization. For example, a regional bank will often have bank branches dispersed across a particular state or group of states, while a national bank could have thousands of cash-points dispersed across its service area. Cash-point 50a includes bank branch 52, vault 58, and note processing agent 70. Customer 60a enters bank branch 52 to conduct transactions against an account that customer 60a holds with the financial institution that bank branch 52 is associated with. Cash-points include any location associated with the financial organization at which currency or bank notes are stored or processed. For example, Cash-point 50b includes ATM 54, while cash-point 50c includes vault 56. The system 100 described in FIG. 1 is merely illustrative of the configuration of a banking organization. Those of ordinary skill in the art will understand the numerous configurations of cash-points that may be managed under the teachings of the present disclosure.

Computer 10 and historical demand data database 40 may be implemented in a variety of configurations without departing from the scope of the present disclosure. For example, cash management process 22 can be implemented as a service provided by a public cloud provider and operated by a cash management provider, i.e., according to a software as a service ("SaaS") model. The cash management provider often has expertise in forecasting currency demand and may have access to large amounts of historical demand data from various financial institutions and central banks due to previous business engagements. Due to the sensitive nature of the hosted data, some financial institutions prefer to host this data within secure private environments, such as on a server operated at a central location within the bank's central or technical offices.

In certain embodiments, customer 60a initiations a transaction at bank branch 52. For example, customer 60a initiates a withdrawal request. In one example, note processing agent 70 includes a currency counting machine that dispenses banknotes to customer 60a and logs the transaction with banking system software. Other information including attributes of the dispensed banknotes can be recorded. For example, a serial number of each banknote dispensed may be recorded. The information regarding the transaction is transmitted via a network to computer 10, which implements cash management process 22, that stores the transaction data in historical demand data 40. Historical demand data 40 may accumulate in such a fashion, or may be imported from additional data sources to provide a base data set to work with. Historical demand data may be accumulated across years to provide a representative data set regarding past utilization of an institution's financial cash-point resources.

As another example, customer 60a makes a deposit against his/her account at bank branch 52. The deposit may be made to a bank teller who, in some embodiments, feeds the deposited currency to note processing agent 70. Alternatively, customer 60a provides note processing agent 70 with the deposited cash directly. In yet another embodiment, a bank teller manually notes the deposit via a computer terminal (e.g., not processing agent 70) at the teller window, and places the deposited currency in vault 58, or another area for additional processing before placing the deposit in vault 58.

Information regarding the deposit is collected by note processing agent 70. For example, information regarding the denomination and condition of the deposited bank notes is collected. As another example, information regarding the serial number, authenticity, date of circulation, and other attributes for each deposited note are collected. Information regarding the deposit is additionally collected. For example, the date, amount, and location of the deposit is stored. This information is transmitted to cash management process 22 via a network and is stored in historical demand data 40.

In certain embodiments, cash management process 22 retrieves historical demand data for a given time period from database 40. For example, cash management process may retrieve historical sample data sets for each cash-point in the Mid-Atlantic United States region (e.g., cash-points 50a, 50b, and 50c) over a particular range of days to determine currency demand trends. Data can be compared year over year to spot anomalies and forecast demand spikes. Various other statistical analyses can be utilized to determine trends, spot demand anomalies, and forecast currency demand in the branches.

As one example, historical demand data is utilized to develop a baseline for a particular cash-point. The baseline can be used to detect anomalies in cash inventory levels so that currency shortages are detected before becoming problematic. For example, if current currency inventory data deviates from the baseline reserve data, the cash management process 22 can initiate a currency transfer so that reserve levels are maintained within the baseline thresholds established by the historical demand data.

Demand forecasts for newly added cash-points may additionally be forecasted even though no transaction data for the new cash-point has been stored yet. For example, if a new branch opens, historical data for other cash-points in the region can be utilized to forecast likely currency demand at the new branch. Cash management process 22 can also determine aggregate demand for a region, and estimate that some demand would be offset by the opening of the new cash-point.

Cash management process 22 can be configured to generate a schedule for transferring currency between cash-points, such as between bank branch 52, ATM 54, and vault 56. The schedule is generated based on historical demand data and current inventory conditions at each cash-point. Cash management process 22 can utilize currency attribute data collected via note processing agents, such as note processing agent 70, to generate currency transfer manifests for assembly and fulfillment of the currency transfer schedule. The transfer manifests direct bank employees at cash-points to assemble specific sets of currency for transferring. For example, denomination and quality requirements as well as pick-up time may be specified in the manifest instructing employees to assemble the currency to meet the requirements. The assembled set of currency can then be retrieved and delivered to the specified cash-point.

Cash management process 22 creates the transfer and delivery schedule with an eye towards optimizing efficiency. In one example, a shortest path algorithm uncovers a ranking of the closest cash-points with available currency reserves for transfer in order to build the delivery schedule. Further, lowest cost carriers could be determined. In emergency situations, immediate delivery by a bank employee can be recommended to meet a currency shortage crisis.

Currency quality data is especially useful for those cash-points which require a particular caliber of currency for dispensing. Some cash-points use automated delivery mechanisms with low tolerances for variations in dispensed currency since no employee is present to oversee operation or attend to customer complaints. For example, ATM's often require a high standard of currency termed ATM fit notes. This may be the highest standard and may require banknotes of the highest quality. Thus, currency delivery to an ATM must be prepared with only banknotes that fit this quality standard. Certain note processing agents 70 render determinations as to fitness levels of processed notes, to provide for the sorting and storing of notes based on fitness level. Currency attribute data may contain this information. Thus, when preparing a currency transfer schedule, cash management process 22 can determine cash-points with suitable cash reserve inventory for meeting the demand requirements of the ATM.

In certain embodiments, cash management process 22 delivers notes from two separate cash-points in order to meet cash demand requirements. For example, it may be difficult to find one single cash-point with excess reserves suitable to fulfill the demand requirements of an active ATM. IN that situation, notes may are transferred from several cash-points. Details regarding such a delivery are specified in the transfer and delivery schedule.

Cash management process 22 can schedule recurring transfers of currency between cash-points. For example, if a first cash-point is determined to be a weekly net depositor and a second cash-point is determined to be a weekly net withdrawer, a weekly transfer of banknotes between the branches can be scheduled. Discounts on shipping may be realized by setting up a recurring transfer.

Figure 2:
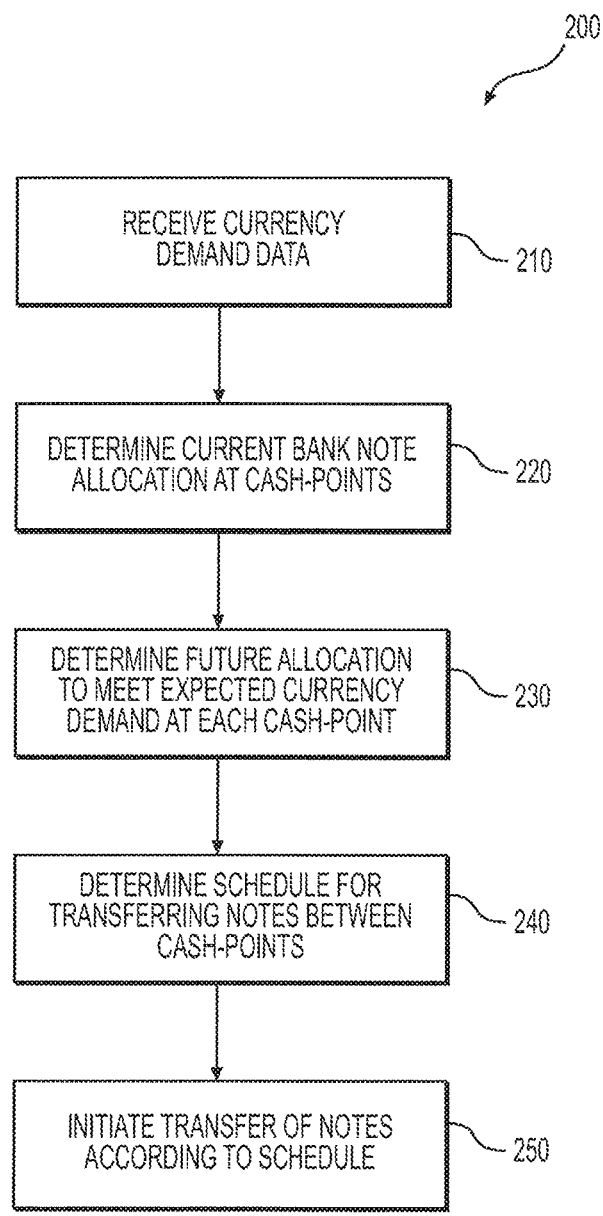
FIG. 2 illustrates a flow chart of a method for cash-point inventory management with demand forecasting in accordance with a particular non-limiting embodiment of the present disclosure.

With reference to FIG. 2, a method 200 for cash-point inventory management with demand forecasting is illustrated in accordance with a non-limiting embodiment of the present disclosure. At step 210, currency demand data is received. The demand data includes historical currency demand data including transaction history for various cash-points within a financial organization. The demand data additionally includes information from which an accurate picture of currency reserves may be drawn for each cash-point in a financial institution.

At step 220, an inventory of the current bank-note allocation at various cash-points associated with a financial institution is determined, for example, by receiving inventory information from each cash-point. In certain embodiments, currency reserve allocation is determined with reference to transaction data. In one example, given a starting inventory and transaction information, the system automatically updates a currency inventory model to provide an up-to-date picture of the current cash reserve status of each cash-point.

The currency demand data is analyzed for trends, anomalies, and other statistical variations to forecast future currency demand. A model may be generated and demand forecasts can be applied to the model in order to determine where potential currency inventory shortages are likely to occur.

At step 230, a future currency allocation is determined in order to meet expected currency demand at each cash-point. With reference to the above model and analysis, cash-points that are likely to experience a cash inventory shortfall are determined and an optimal currency allocation is generated. The optimal currency allocation will satisfy the currency demand at each cash-point.

At step 240, a schedule for transferring notes between cash-points is generated based on the future currency allocation. The schedule lays out a plan for effecting the optimal allocation in each of the cash-points. For example, an analysis regarding shipping routes, carriers, currency fitness levels, currency denominations, time requirements, and cost reduction yields an optimal currency transfer schedule for meeting demand requirements at each cash-point.

At step 250, the transfer is initiated according to the schedule set forth in step 240. In certain embodiments, the transfer is automatically initiated by preparing work orders for employees at each cash-point. Transportation for delivery of the notes is also scheduled. In certain embodiments, the scheduling is manually initiated by a bank central branch manager.

Figure 3:
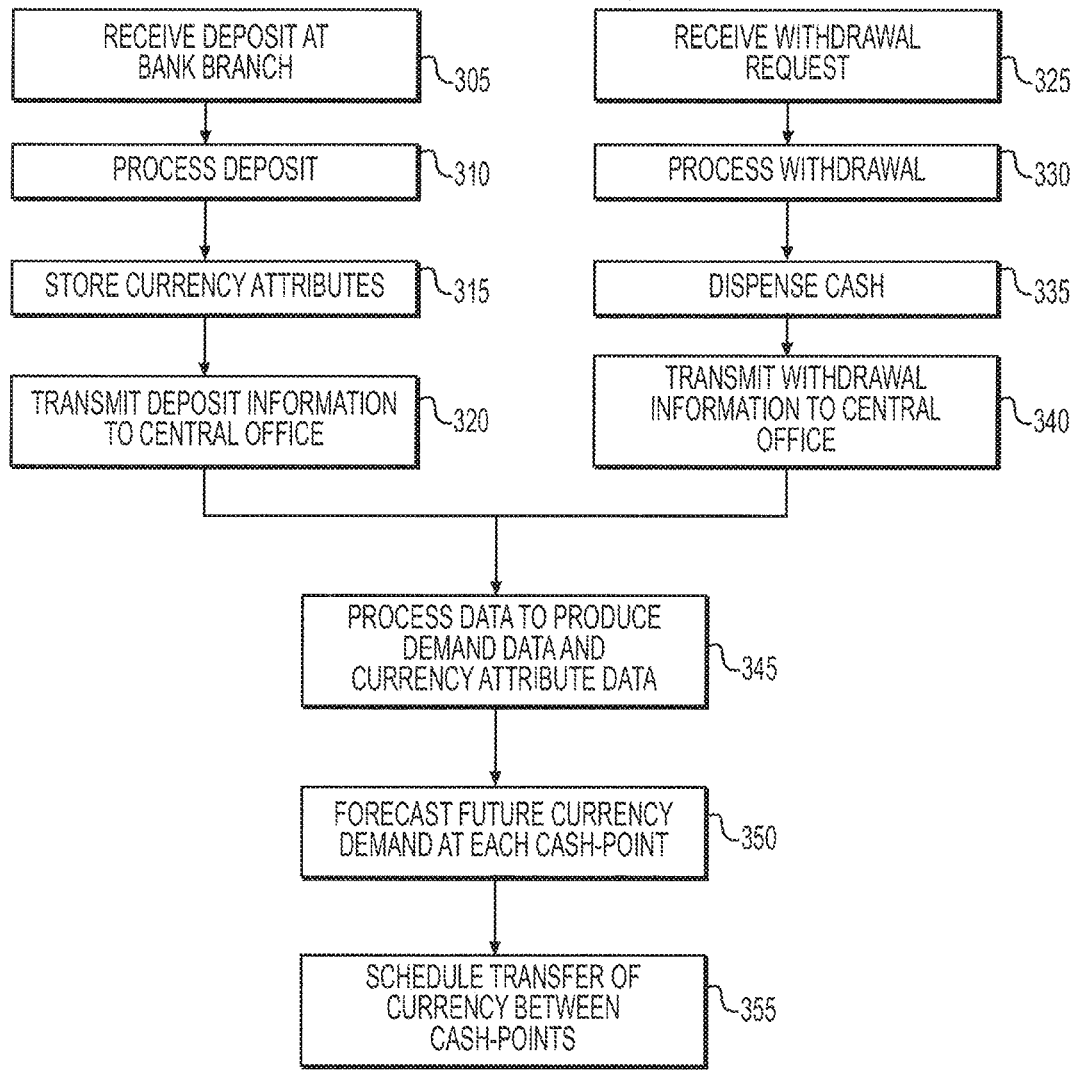
FIG. 3 illustrates a flow chart of a method for cash-point inventory management with demand forecasting in accordance with a particular non-limiting embodiment of the present disclosure.

With reference to FIG. 3, a method for cash-point inventory management with demand forecasting is illustrated in accordance with another non-limiting embodiment of the present disclosure. At step 305, a deposit is received at a bank branch cash-point. At step 310, the bank branch processes the deposit using a transaction management system, such as those systems described above. Processing the deposit includes storing currency attributes of the deposited banknotes at step 315. Currency attributes include quality metrics and may include a fitness determination, which is made by one or more of the cash-point or bank central office. This information may additionally include transaction information. At step 320, deposit information is transmitted to the bank's central cash management system.

At step 325, a withdrawal request is received at a cash-point. At step 330, the withdrawal request is processed, and currency is dispensed to the requestor at step 335. Information regarding the dispensed currency including currency attributes as described above may be collected. Transaction information and dispensed currency attributes are transmitted to the central bank office at step 340.

At step 345, the data from steps 320 and 340 is received and processed to produce demand data. Over time, this data can be aggregated to produce historical demand data. This data can also be used to generate currency inventory allocation data regarding currency inventories at each cash-point.

At step 350, future currency demand is forecasted for each cash-point based on the historical demand data. Additional data sources may be consulted in determining the forecasts, including manual inputs regarding known upcoming demand-events.

At step 355, transfer of currency between cash-points is scheduled with reference to the forecasted future currency demand and the current currency inventory allocation.

In certain embodiments, a graphical user interface is generated and displayed. The interface presents a hierarchical representation of a financial organization. For example, the interface includes a graphical representation of cash positions of a bank, including cash inventory and status information for each cash-point associated with a financial institution. For example, a central bank maintains cash vaults throughout the country. Small circles in the interface represent the amount of inventory at each cash vault. A colored highlight or fill-in may be applied based on currency inventory falling below or rising above threshold levels. Colors may also be applied to the interface to signal activity at each cash-point. In one example, yellow or red indicates low inventory levels or high withdrawal levels while green indicates that the cash-point is a net depositor. The user interface may provide a geographical representation of the location and status of currency inventories at each cash-point in a banking system.

The user interface described above can be applied in the context of commercial banks. For example, commercial banks often have vaults located at each branch, as well as ATM's located throughout its service territory. The teachings of the present disclosure as described above apply to any commercial bank entity, including ATM's, vaults, branches, and the like.

Data for the interface may be received from cash management software, which may be implemented in house at each commercial bank, or may be provided by a cash management service provider. For example, an ATM network provides status reports for each machine, while terminal SAP software is implemented in each bank branch. Cache recyclers and smart safes are often implemented to provide useful output regarding processed currency. The teachings of the present disclosure provide for interfacing with various heterogeneous systems and gather data for use in interface displays and/or demand forecasting and currency inventory transfer scheduling.

Figure 4:
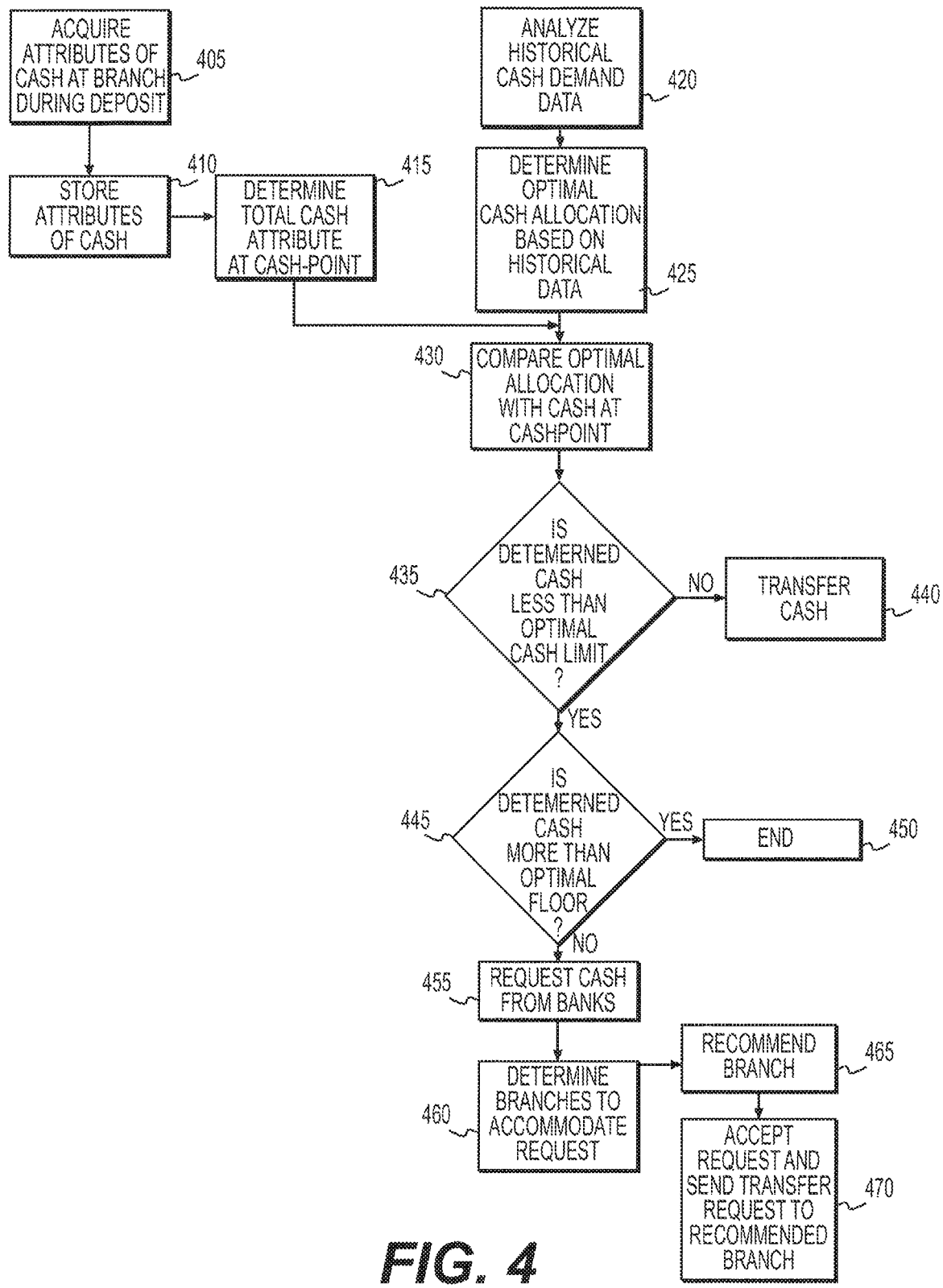
FIG. 4 illustrates a flow chart of a method for cash-point inventory management with demand forecasting in accordance with a particular non-limiting embodiment of the present disclosure.

With reference to FIG. 4, a method for cash-point inventory management with demand forecasting is illustrated in accordance with yet another non-limiting embodiment of the present disclosure. The method of FIG. 4 details the process for determining suitable currency fitness levels at cash-points and determining suitable cash-points for accommodating transfer requests.

In certain embodiments, initiating the transfer process includes submitting a transfer request to a branch, which may choose to accept or reject the transfer request. A bank central office may offer incentives to the cash-points (i.e., branch managers or ATM managers) in exchange for preparing and fulfilling transfer requests. Thus, the cash-point manager or bank employee may choose to accept or reject the currency transfer request.

In certain systems, currency condition is tracked and managed with reference to a serial number embedded on a banknote, while information regarding the total number and denomination of banknotes at various locations is aggregated for analysis by managers. Systems permit flagging and tracking of defective or anomalous banknotes, for eventual removal or replacement.

The teachings of the present disclosure present a cash and vault management super system that can be used to autonomously resolve and handle a range of objectives and tasks within the cash management lifecycle. In certain embodiments, historical currency monitoring data is used to simulate, test, and validate cash transfer, delivery, and/or production operations of a financial organization. Information can be presented in a variety of graphical representations, including a hierarchical geography-based view of a financial organization.

Some banknote processing equipment contains a number of sensors that capture different types of banknote features during processing. In some applications, the information captured is used in real-time to determine the fate of the note (e.g., recycling, destruction or reject) and only summary data are captured from the sensors for use off-line.

Improvements in both data communications and data storage allow more information to be extracted from each note processed (for example, image, serial number, sensor results, etc.). A complete data profile for each note processed creates a large amount of data (terabytes/hour), perhaps more than a high-resolution video camera that uses data compression to reduce the redundant data in each frame. But for banknote reconciliation, compression is not required if each note is considered unique.

The sensors used for processing banknotes perform a variety of functions. In one example, an image sensor examines a note under various wavelengths of light, looking for the presence/absence of visual features and other complex tasks. The output of an image sensor can be as much as 10 MB (or more) per note, for example. A banknote processing machine makes use of the various sensor outputs using one (or more) pre-determined formulas that can be "fine-tuned" according to the circumstances. For example, the destruction of "soiled" notes can be determined according to the "clean money" policy of the Central Bank. Because every shredded note is often replaced with a newly printed banknote, the economics of banknote destruction play a role in each country. But in summary, as the data captured (or potentially captured) by the sensor "suite" has increased, technology provides for improvements such that it is feasible to capture an expanded set of data for every banknote processed.

Bank central offices often collect serial number information capture via Banknote Processing Equipment. Serial number capture has been available for most currencies in high-speed equipment for some years now. Serial numbers are used to determine banknote age, origin (and distance from origin), frequency of processing (for example, tracking the number of times the same bill has been processed), and the like. Serial numbers are also captured for notes destroyed so that if a banknote re-appears with the same number, an investigation as to authenticity (i.e., counterfeiting) can be requested.

The capture and storage of individual banknote sensor information facilitates in banknote processing and, more specifically, in the handling and management of rejects. Each banknote, by definition, is unique. This is at least coming from a unique serial number, but because each note has traveled a different route to its ultimate inclusion in a deposit being processed, there will be subtle differences among the notes.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations or block diagrams, may be implemented by computer program instructions, for example. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the function(s) specified in the flowcharts or block diagram block(s).

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function(s) specified in the flowchart or block diagram block(s). The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the function(s) specified in the flowcharts or block diagram block(s). For example, wireless devices described herein are examples of such programmable data processing apparatuses.

Aspects of the present disclosure may be implemented by various combinations of apparatuses, devices, systems, or components thereof, for example. Reference in the appended claims to an apparatus, device, or system or a component thereof being configured to or operable to perform a particular function encompasses that apparatus, system, component, or device, whether such apparatus, system, component, or device or such particular function is activated, turned on, or unlocked, as long as that apparatus, system, or component is so configured or operable.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A method for managing an allocation of currency based currency demand data, comprising:

receiving, at a processor of a currency management server device, (1) currency demand data for a plurality of cash-points and (2) currency attribute data for notes at each of the plurality of cash-points via a network interface, wherein the currency attribute data is stored in memory operatively connected to the currency management server device and comprises characteristics of the notes that are collected by at least one note processing device comprising an image sensor such that the characteristics of each note is correlated by a serial number of each note captured by the image sensor;

analyzing, at the processor of the currency management server device, a note fitness level for notes at each of the plurality of cash-points based on the currency attribute data received via the network interface;

determining, at the processor of the currency management server device, a first currency allocation indicative of a current allocation of the notes at each of the plurality of cash-points based on the currency attribute data received via the network interface;

determining, at the processor of the currency management server device, a second currency allocation indicative of a future allocation of the notes required to meet an expected currency demand at each of the plurality of cash-points based on the currency demand data, wherein the currency demand data is based in part on a collection of transaction data, received via the network interface of the currency management server device, from transactions conducted at the plurality of cash-points; and generating, at the processor of the currency management server device, a schedule for transferring the notes between one or more of the plurality of cash-points to effect the second currency allocation in the plurality of cash-points to meet the expected currency demand, wherein generating the schedule for transferring the notes further comprises:

determining that currency reserves at a second cash-point based on the current allocation of the notes will not accommodate the expected currency demand at the second cash-point;

determining a required fitness level for notes at the second cash-point; and analyzing the notes to determine a first set of notes at a first cash-point that satisfy the required fitness level for notes at the second cash-point, wherein generating the schedule for transfer of the first set of notes from the first cash-point to the second cash-point will accommodate the expected currency demand for notes of the required fitness level at the second cash-point.

2. The method of claim 1, wherein generating the schedule for transferring the notes further comprises:
determining, at the processor of the currency management server device, the first cash-point to secure delivery of notes from, based on:
an estimated cost for shipping notes from the first cash-point to the second cash-point; and
an estimated time for shipping notes from the first cash-point to the second cash-point.

3. The method of claim 1, wherein a first cash-point is a bank branch and a second cash-point is an automated teller machine, and wherein the bank branch and the automated teller machine are associated with a particular financial institution.

4. The method of claim 1, wherein a transfer of notes according to the generated schedule is automatically initiated based on a change in the currency demand data, wherein the change is greater than a threshold.

5. The method of claim 1, wherein the currency demand data comprises currency deposit data and currency withdrawal data.

6. A computer configured to access a storage device, the computer further configured to manage an allocation of currency based currency demand data, comprising:
a processor
a network interface; and
a non-transitory, computer-readable storage medium storing computer-readable instructions that when executed by the processor cause the computer to perform:
receiving, via the network interface, (1) currency demand data for a plurality of cash-points; and (2) currency attribute data for notes at each of the plurality of cash-points, wherein the currency attribute data is stored on the storage device and comprises characteristics of the notes that are collected by at least one note processing device comprising an image sensor such that the characteristics of each note is correlated by a serial number of each note captured by the image sensor;
analyzing a note fitness level for notes at each of the plurality of cash-points based on the currency attribute data received via the network interface;
determining a first currency allocation indicative of a current allocation of the notes at each of the plurality of cash-points based on the currency attribute data received via the network interface;
determining a second currency allocation indicative of a future allocation of the notes required to meet an expected currency demand at each of the plurality of cash-points based on the currency demand data, wherein the currency demand data is based in part on a collection of transaction data, received via the network interface, from transactions conducted at the plurality of cash-points; and
generating a schedule for transferring the notes between one or more of the plurality of cash-points to effect the second currency allocation in the plurality of cash-points to meet the expected currency demand, wherein generating the schedule for transferring the notes further comprises:
determining that currency reserves at a second cash-point based on the current allocation of the notes will not accommodate the expected currency demand at the second cash-point;
determining a required fitness level for notes at the second cash-point; and
analyzing the notes to determine a first set of notes at a first cash-point that satisfy the required fitness level for notes at the second cash-point, wherein the scheduled transfer of the first set of notes from the first cash-point to the second cash-point will accommodate the expected currency demand for notes of the required fitness level at the second cash-point.

7. The computer of claim 6, wherein generating the schedule for transferring the notes further comprises:
determining the first cash-point to secure delivery of notes from, based on:
an estimated cost for shipping notes from the first cash-point to the second cash-point; and
an estimated time for shipping notes from the first cash-point to the second cash-point.

8. The computer of claim 6, wherein a first cash-point is a bank branch and a second cash-point is an automated teller machine, and wherein the bank branch and the automated teller machine are associated with a particular financial institution.

9. The computer of claim 6, wherein a transfer of notes according to the generated schedule is automatically initiated based on a change in the currency demand data, wherein the change is greater than a threshold.

10. The computer of claim 6, wherein the currency demand data comprises currency deposit data and currency withdrawal data.

11. A computer program product comprising:
a computer-readable storage medium having computer-readable program code embodied therewith, the computer-readable program code comprising:
computer-readable program code configured to receive, via a network interface, (1) currency demand data for a plurality of cash-points; and (2) currency attribute data for notes at each of the plurality of cash-points, wherein the currency attribute data comprises characteristics of the notes that are collected by at least one note processing device comprising an image sensor such that the characteristics of each note is correlated by a serial number of each note captured by the image sensor;
computer-readable program code configured to analyze a note fitness level for notes at each of the plurality of cash-points based on the currency attribute data received via the network interface;
computer-readable program code configured to determine a first currency allocation indicative of a current allocation of the notes at each of the plurality of cash-points based on the currency attribute data received via the network interface;
computer-readable program code configured to determine a second currency allocation indicative of a future allocation of the notes required to meet an expected currency demand at each of the plurality of cash-points based on the currency demand data, wherein the currency demand data is based in part on a collection of transaction data, received via the network interface, from transactions conducted at the plurality of cash-points;
computer-readable program code configured to generate a schedule for transferring the notes between one or more of the plurality of cash-points to effect the second currency allocation in the plurality of cash-points to meet the expected currency demand, wherein computer-readable program code configured to generate the schedule for transferring the notes further comprises:
- computer-readable program code configured to determine that currency reserves at a second cash-point based on the current allocation of notes will not accommodate the expected currency demand at the second cash-point;
- computer-readable program code configured to determine a required fitness level for notes at the second cash-point; and
- computer-readable program code configured to analyze the notes to determine a first set of notes at a first cash-point that satisfy the required fitness level for notes at the second cash-point, wherein computer-readable program code is configured to generate the schedule for transfer of the first set of notes from the first cash-point to the second cash-point to accommodate the expected currency demand for notes of the required fitness level at the second cash-point.

12. The computer program product of claim 11, wherein computer-readable program code configured to generate the schedule for transferring the notes further comprises:
- computer-readable program code configured to determine the first cash-point to secure delivery of notes from, based on:
  - an estimated cost for shipping notes from the first cash-point to the second cash-point; and
  - an estimated time for shipping notes from the first cash-point to the second cash-point.

13. The computer program product of claim 11, wherein a first cash-point is a bank branch and a second cash-point is an automated teller machine, and wherein the bank branch and the automated teller machine are associated with a particular financial institution.

14. The computer program product of claim 11, wherein a transfer of notes according to the generated schedule is automatically initiated based on a change in the currency demand data, wherein the change is greater than a threshold.

15. The method of claim 1, wherein the step of analyzing the note fitness level, at the processor of the currency management server device, for notes at each of the plurality of cash-points is based on the currency attribute data comprising at least soil level information for each note acquired by the image sensor.

16. The computer of claim 6, wherein analyzing the note fitness level for notes at each of the plurality of cash-points is based on the currency attribute data comprising at least soil level information for each note acquired by the image sensor.

17. The computer program product of claim 11, wherein the computer-readable program code configured to analyze the note fitness level for notes at each of the plurality of cash-points is based on the currency attribute data comprising at least soil level information for each note acquired by the image sensor.

* * * * *